US005737635A

United States Patent [19]
Daines et al.

[11] Patent Number: 5,737,635
[45] Date of Patent: *Apr. 7, 1998

[54] VARIABLE LATENCY CUT THROUGH BRIDGE HAVING VARIABLE LATENCY THRESHOLD POINT BEING CONFIGURED DYNAMICALLY FOR FORWARDING PACKETS WHILE THE BRIDGE IS OPERATING

[75] Inventors: Bernard N. Daines, Union City; Lazar Birenbaum, Saratoga; Richard J. Hausman, Soquel, all of Calif.

[73] Assignee: Cisco Technology, Inc., San Jose, Calif.

[*] Notice: The term of this patent shall not extend beyond the expiration date of Pat. No. 5,598,581.

[21] Appl. No.: 672,369

[22] Filed: Oct. 2, 1996

Related U.S. Application Data

[63] Continuation of Ser. No. 103,439, Aug. 6, 1993, Pat. No. 5,598,581.

[51] Int. Cl.$^6$ .................................................. G06F 13/00
[52] U.S. Cl. ............... 395/872; 395/200.62; 395/200.63; 395/200.68; 395/842
[58] Field of Search .................. 395/872, 200.62, 395/200.63, 200.68, 842

[56] References Cited

U.S. PATENT DOCUMENTS

| 4,399,531 | 8/1983 | Grande et al. | 370/60 |
|---|---|---|---|
| 4,627,052 | 12/1986 | Homre et al. | 370/88 |
| 4,679,193 | 7/1987 | Jensen et al. | 370/94 |
| 4,769,810 | 9/1988 | Eckberg, Jr. et al. | 370/60 |
| 4,769,811 | 9/1988 | Eckberg, Jr. et al. | 370/60 |
| 4,771,391 | 9/1988 | Blasbalg | 364/514 |
| 4,839,891 | 6/1989 | Kobayashi et al. | 370/94 |
| 4,841,527 | 6/1989 | Raychaudhuri | 371/32 |
| 4,845,709 | 7/1989 | Matsumoto et al. | 370/86 |
| 4,860,003 | 8/1989 | DeLuca et al. | 340/825.44 |
| 4,891,803 | 1/1990 | Juang et al. | 370/60 |

(List continued on next page.)

OTHER PUBLICATIONS

Kalpana, Etnerswithc Product Overview, Mar. 1990, pp. 1–20.
Artel, Galactgica Stenbridg C/802.3 Application Note, Nov. 1991, pp. 1–26.
Synernetics, Lanplex 5000: Intra–Network Banowidth, 1992, pp. 1–12.
Synernetics, Lanplex 5000 Intelligent Switching Hubs, 1993, pp. 1–9.
Synernetics, Lanplex 5000 Family, 1992, pp. 1–6.
Synernetics, Etheract Express Module, 1991, pp. 1–4.
Synernetics, Ethernet Switching Module, pp. 1–4.
Kalpana, Etherswitch LPS 500, pp. 1–2.
Kalpana, Etherswitch EPS–1500, pp. 1–2.
Atlantec, Alantec Logical Filtering, pp. 1–6.
Atlantec, Powerhub Architectures, Dec. 1992, pp. 1–6.
artel comjunications, galactica super switching hub, pp. 1–4.
Artel Communications, 8–Poert STA–Bridge Turbo Switch, pp. 1–2.
Atlantec, Power Hub Packet Engine, pp. 13–18.
Bradner, Scott O., "Ethernet Bridges and Routes", Feb. 1992, pp. 1–10, Data Communications.
Kwok, Conrad K. and Biswanath Mjkerjec, "Cut–Through Bridging for CSMA/CD Local Area Network", Jul. 1990, pp. 938–942, I EEE Transactgions on Communications, vol. 38, No. 7.

*Primary Examiner*—Thomas C. Lee
*Assistant Examiner*—Le Hien Luu
*Attorney, Agent, or Firm*—Hickman Beyer & Weaver, LLP

[57] ABSTRACT

A variable latency cut through bridge (210) for selectively forwarding data packets (10) within a network (310) of computers (312), the variable latency cut through bridge (210) employing a variable latency bridging method wherein the latency factor of the variable latency cut through bridge (210) is set according to the position of a variable threshold point (428). The variable threshold point (428) is optionally set to within a rapid drop off portion (520) of a probability line (514) describing the probability that the data packet (10) is bad as a function of the amount of the packet (10) which has been examined within the variable latency cut through bridge (210).

34 Claims, 5 Drawing Sheets

U.S. PATENT DOCUMENTS

| | | | |
|---|---|---|---|
| 4,922,503 | 5/1990 | Leone | 370/402 |
| 4,926,415 | 5/1990 | Tawara et al. | 370/60 |
| 5,014,265 | 5/1991 | Hahne et al. | 370/60 |
| 5,020,058 | 5/1991 | Holden et al. | 370/109 |
| 5,088,091 | 2/1992 | Schroeder et al. | 370/406 |
| 5,103,446 | 4/1992 | Fischer | 370/85.1 |
| 5,117,486 | 5/1992 | Clark et al. | 395/250 |
| 5,123,091 | 6/1992 | Newman | 395/850 |
| 5,193,151 | 3/1993 | Jain | 395/200 |
| 5,247,517 | 9/1993 | Ross et al. | 370/85.5 |
| 5,303,302 | 4/1994 | Burrows | 380/49 |
| 5,307,345 | 4/1994 | Lozowick et al. | 370/61 |
| 5,313,454 | 5/1994 | Bustini et al. | 370/13 |
| 5,317,562 | 5/1994 | Nardin et al. | 370/16 |
| 5,377,196 | 12/1994 | Godlew | 371/20.1 |
| 5,404,353 | 4/1995 | Ben-Michael et al. | 370/79 |
| 5,412,780 | 5/1995 | Rushton | 395/250 |
| 5,473,607 | 12/1995 | Hausman et al. | 370/85.13 |
| 5,491,687 | 2/1996 | Christensen et al. | 370/17 |
| 5,598,581 | 1/1997 | Daines et al. | 395/872 |

VARIABLE LATENCY CUT THROUGH BRIDGE HAVING VARIABLE LATENCY THRESHOLD POINT BEING CONFIGURED DYNAMICALLY FOR FORWARDING PACKETS WHILE THE BRIDGE IS OPERATING

This is a continuation of application Ser. No. 08/103,439 filed on Aug. 6, 1993, now U.S. Pat. No. 5,598,581.

TECHNICAL FIELD

The present invention relates generally to the field of computer science and more particularly to an improved device and method for communicating between computers. The predominant current usage of the variable threshold network packeting method is in computer networks wherein a number of individual computers are interconnected for the sharing of programs and data.

BACKGROUND ART

The interconnection of computers such that programs and data can be shared among a network of computers is presently a subject of much interest. A number of different methods and means for communicating program and/or file data between computers have been devised, and some of these have developed into standards which allow for the interconnection of computer devices which are in compliance with such standards. A specification for one such convention is found in the Institute of Electrical and Electronic Engineers ("IEEE") standard 802.3. This standard specifies the protocol for a Local Area Network ("LAN") communications method which is commonly referred to as "Ethernet" or, more descriptively as "carrier-sense, multiple access with collision detection" ("CSMA/CD").

Groups of computers connected via LANs in general and Ethernet in particular can be broken into segments or separate LANs on an application and/or a geographical basis. Each segment or LAN can consist of one or more computers. The segments and LANs may be connected together in a topology by switching elements employing a variety of information forwarding schemes. Each segment of an interconnected LAN is electrically distinct but logically continuous in that information transmitted from one computer to another appears on all segments of a network. Connected LANs are not only electrically distinct but are also logically separate in that information is selectively forwarded from one LAN of an interconnected network to some subset of the other LANs of the network, depending upon the topology of the segments and information forwarding schemes of the network switching elements.

Figure 1:
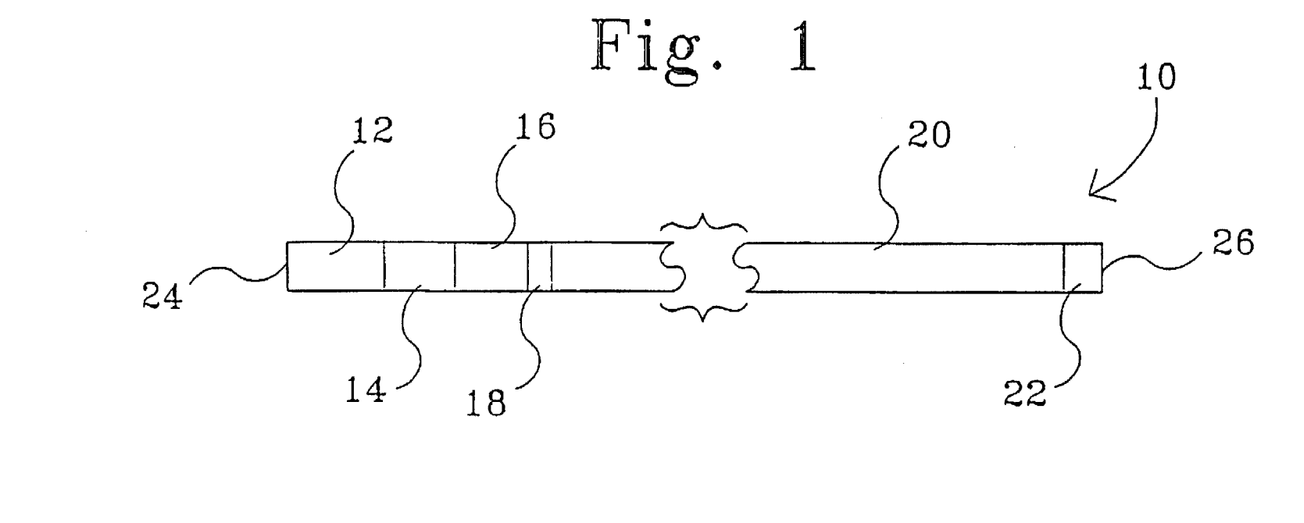
FIG. 1 is a block diagram of a standard Ethernet packet.

In Ethernet, as in several other computer intercommunication methods, information is communicated in units sometimes referred to as "packets". An Ethernet packet is depicted in FIG. 1 and is designated therein by the general reference character 10. The standardized Ethernet packet 10 has a preamble 12 which is 64 bits in length, a destination address 14 which is 48 bits in length, a source address 16 which is 48 bits in length, a length/type field 18 which is 16 bits in length and a data field 20 which is variable in length from a minimum of 46 eight bit bytes to a maximum of 1500 bytes. Following the data field 20 in the packet 10 is a 4 byte (32 bit) frame sequence check ("FCS") 22. The packet 10 is transmitted serially beginning at a "head" 24 and ending at a "tail" 26 thereof.

In CSMA/CD (Ethernet), computers and switching elements having a packet 10 destined for a particular computer of the network "listen" for the appropriate segment of a LAN to be quiet before transmitting the packet 10. This feature is to avoid interference on the segment and is the "carrier sense" aspect of CSMA/CD. "Multiple access" relates to the distributed nature of the decision making among the computers and switching elements that access a particular LAN.

Despite the carrier sense function it is, nevertheless, possible for more than one computer or switching element to have a packet 10 ready to send to a LAN at precisely the same time. In such an instance, when both units sense quiet on the segment, both begin to transmit at the same time. Each of these transmitting computers and/or switching elements will then detect that a "collision" has occurred and will abort its respective transmission. The resulting incomplete (improperly formed) packets 10 are known as "runts".

Various different types of switching elements have been utilized to electrically interconnect LANs and segments of LANs. For example a "repeater" is a simple switching element which interconnects segments of a LAN. The function of a repeater is merely to receive a data stream from one segment of the LAN and forward it on to the other connected segments of the LAN. The carrier sense and collision detect functions of CSMA/CD take place on all segments of a LAN simultaneously with all computers and switching elements listening for quiet and/or detecting collisions in parallel. All the segments of a LAN interconnected by repeaters are said to be in the same "collision domain", since only one packet 10 can traverse a LAN at a time no matter what is the arrangement of the segments of the LAN. Multiple repeaters can connect numerous segments into a single LAN.

A "bridge" is a somewhat more sophisticated switching element in that it directs data streams between LANs and can, in fact, forward more than one packet 10 at a time with the restriction, discussed above, that only one packet 10 at a time is allowed on each of the connected LANs whether it be transmitting or receiving. Packets received from LANs are directed to their intended destinations by selecting which of the LAN(s) are to receive a particular packet 10. Given the description of the packet 10 previously discussed herein, it can be appreciated that a bridge must have some buffering capability, as it cannot ascertain the intended destination of a packet 10 at least until the destination address 14 is received and interpreted. A so called "standard bridge" receives the packet 10 into its buffer before forwarding it. A "cut through bridge" attempts to speed up the process by beginning to forward the packet 10 before it is fully received (typically, as soon as the destination address 14 is received at the bridge). However, it may not be possible to forward the packet 10 as soon as the destination address 14 is received, since the destination LAN may not be quiet (for example, because another computer or switching element of the destination LAN is transmitting, or for any of various other reasons). Therefore, a bridge should have the capability of buffering substantially more than one packet 10 so that packets 10 can be queued for subsequent sending therefrom. Furthermore, a bridge may be required to retransmit a packet 10 if there is a collision in the destination LAN. This "buffering" in the bridge is required so as to avoid "reflecting" the collision to the source LAN.

The scheme discussed above may seem to be rather simple in description, but it becomes somewhat more complicated in practice. For example, since a number of devices may be competing for access to a particular network LAN there will, as previously mentioned, occur collisions of data resulting in the creation of incomplete packets 10 known as runts. Under heavy load conditions or in a large network, runts can occupy a significant portion of the available network traffic capability. A runt occurs because each device involved in a collision stops transmitting when the collision is detected, generally after only a portion of its packet 10 is transmitted.

A "dumb" bridge attempts to forward all packets 10 which it receives. A "filtering" bridge, on the other hand, attempts to identify packets 10 which, for one reason or another, should not be forwarded to a particular segment. Not forwarding ("filtering out") those packets 10 which should not be forwarded from one LAN to another reduces the traffic overhead in the network leaving more bandwidth available for the complete packets 10 which should be forwarded. This filtering also affects the delay a packet 10 faces in being forwarded to a particular LAN in that the lesser amount of the bandwidth which is being consumed by unwanted packets 10, the more often a packet 10 can be forwarded from a source LAN to a destination LAN immediately (without being queued).

Bridges may "choose" which packets 10 to forward to a particular LAN based on a comparison of the destination address 14 of each packet 10 with some accumulated history data relating to the source addresses 16 of packets 10 previously seen from that LAN. Thus, in the case of a bridge, a packet is (generally) forwarded only to the LAN where the destination address 14 of a packet 10 matches a source address 16 of previous packets 10 seen on that LAN. This "destination address filtering" also reduces traffic on various segments of the network, thus increasing overall performance. Another of the several potential reasons why a packet should not be forwarded is that it is a runt. U.S. Pat. No. 4,679,193 issued to Jensen et al. discloses a Runt Packet Filter for filtering out such runts in particular applications.

It can be appreciated in light of the prior discussion that there exist a number of "trade offs" in the operation of prior art network systems. How much of a packet 10 the bridge must receive prior to beginning to forward the packet 10 is known as the "latency" of the bridge. The longer the latency, the longer is the time delay involved in forwarding a packet 10 and, of course, it is desirable to reduce this delay as much as possible in order to speed up communications. On the other hand, to attempt to reduce this delay by allowing a bridge to begin transmission before an entire packet 10 is received, and thus before the packet 10 can be verified as being a complete packet 10 that should indeed be forwarded, will result in the improper forwarding of at least some packets 10. This, of course, will only slow down the system in that not only is time taken in improperly forwarding a packet 10, but also other packets 10 may be queued behind the improper packet 10 which other packets 10 should and could have been immediately forwarded were the bridge not occupied in forwarding the improper packet 10.

Because of these conflicting considerations, prior art cut through bridges have been designed to provide a latency which allows the bridge to filter out only a relatively small percentage of the improper packets 10. Such prior art filtering, as discussed above, has been accomplished primarily based on characteristics of the packets 10 found in the preamble 12 and/or the destination address 14. Since the preamble 12 and the destination address 14 occur early in the packets 10, the simple prior art filtering scheme does have the advantage that filtering packets 10 based upon these characteristics prevents a significant amount of clogging of the system because many unwanted packets 10 can be quickly and easily rejected for forwarding. However, even after such prior art filtering as is described herein, there remain a great many packets 10 which according to prior art methods are, but should not be, forwarded.

Clearly, it would be desirable to eliminate the forwarding of as many improper packets as possible without increasing latency in the bridge to be longer than is absolutely necessary. However, to the inventors' knowledge, no prior art method has succeeded in optimizing throughput of bridges by providing an optimal bridge latency. Moreover, this problem is exacerbated by the fact that what might be an optimal latency in one application of a bridge might well not be optimal in another application. Indeed, the "optimal" latency may even change in a fixed application as changes are made in the structure or usage of the system.

DISCLOSURE OF INVENTION

Accordingly, it is an object of the present invention to provide a method and means for optimizing the latency period within a bridge.

It is another object of the present invention to provide a method and means which can adapt a bridge for maximum throughput in a variety of different network configurations.

It is still another object of the present invention to provide a method and means by which network communication among computer devices is maximized.

It is yet another object of the present invention to provide a method and means for eliminating as many improper data packets as is practical without unduly delaying the forwarding of proper data packets.

Briefly, the preferred embodiment of the present invention is a cut through bridge with a variable latency. Since a large percentage of the improper packets 10 are runts, and since runts can be identified after only a small portion of the packet 10 is received at the bridge (given that a collision, if one has occurred, will be detected soon after the relevant packet 10 has begun to be forwarded), the inventive bridge begins sending after the threshold of most runts. However, there are a number of other improper packets 10 in addition to the runts which should also not be forwarded. In the worst case, a packet 10 may not be identified as being improper until the FCS 22 is encountered. It should be noted that the solution of filtering out only runts, while it eliminates a high percentage of improper packets 10, eliminates only the shortest packets 10, while the greatest time delay is involved in the forwarding of longer improper packets 10. According to the inventive method, after a determination is made as to a threshold cut off point for the network in which a bridge is installed, provision is made for varying the latency of the bridge, from time to time, to optimize throughput on the network for the existing circumstances.

An advantage of the present invention is that throughput on a network is improved.

Yet another advantage of the present invention is that a bridge can operate at optimal efficiency even as the requirements of the application vary.

Still another advantage of the present invention is that a proper balance can be achieved between delays caused by bridge latency and delays caused by the forwarding of improper packets.

Yet another advantage of the present invention is that a network is not clogged with an excess of improper packets, nor does the network unnecessarily delay packets in order to minimize such improper packets.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is a variable latency cut through bridge. The predominant expected usage of the inventive variable latency cut through bridge is in the interconnection LANs of computer devices, particularly in local area networks wherein the maximization of throughput of data packets is desirable. The variable latency cut through bridge connects LANs making up the overall network.

Figure 2:
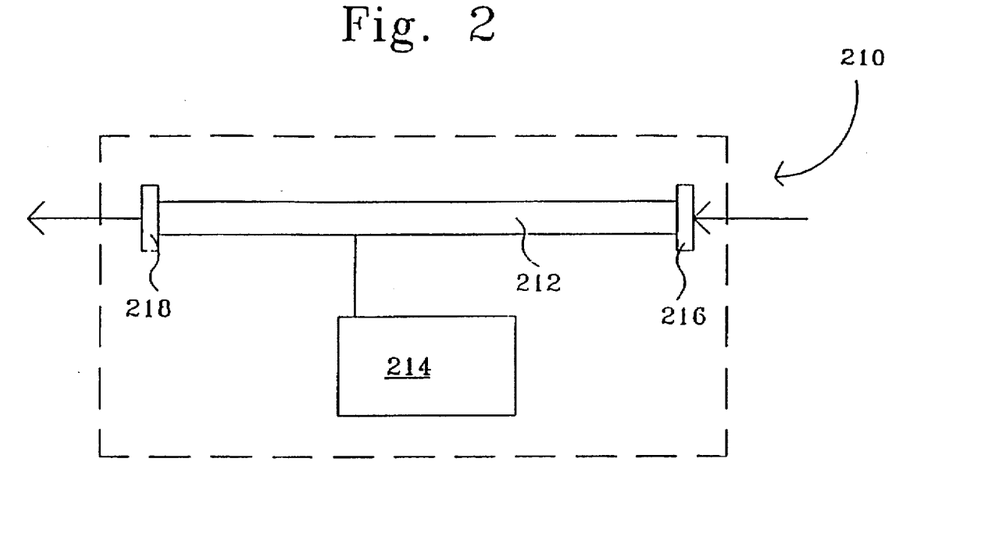
FIG. 2 is a block diagram of a variable latency bridge according to the present invention.

The variable latency bridge of the presently preferred embodiment of the present invention is illustrated in a functional block diagram in FIG. 2 and is designated therein by the general reference character 210. The variable latency cut through bridge 210 described herein is adapted for use with the standardized Ethernet communications packet 10 described in FIG. 1 herein, although the invention is equally application to other communications protocols that use data packets or "frames".

The variable latency cut through bridge 210 has a buffer 212, a controller 214, an input port ("receiver") 216 and an output port ("transmitter") 218. The variable latency cut through bridge 210 described herein is a simplified unit in that it has only the single receiver 216 and the single transmitter 218. Further, the variable latency cut through bridge 210 described herein provides for the forwarding of the packets 10 (FIG. 1) in one direction only. One skilled in the art will recognize that the principles described herein could easily be utilized to build a more complex bridge by the provision of additional receivers 216 and/or transmitters 218 (with appropriate buffers 212 between them, as required), and that bidirectional communications could be accomplished using two iterations of the variable latency cut through bridge 210.

As can be appreciated by a practitioner in the field, an invention such as the one described herein can be accomplished primarily in hardware, in software, or in some combination thereof, the distinction between hardware and software in this context being more a matter of convenience and efficiency than of a critical aspect of the inventive method of the variable latency cut through bridge 210. In the best presently known embodiment 210 of the present invention, handling, forwarding and filtering of the packets 10 is done in the hardware of the variable latency cut through bridge 210 with monitoring and associated functions in software. One skilled in the art, given an understanding of the inventive method as described herein, can readily accomplish a hardware/software combination for accomplishing the inventive method.

Figure 3:
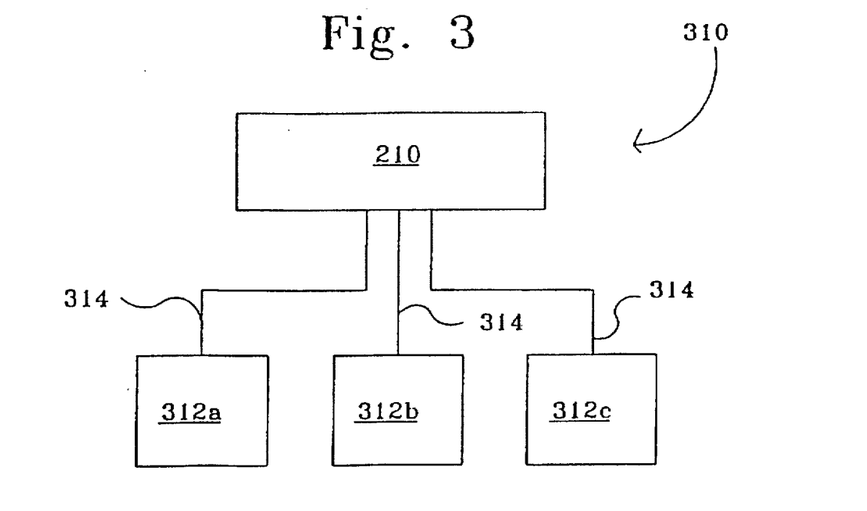
FIG. 3 is block diagram of a simple computer network having therein the variable latency bridge of FIG. 2.

FIG. 3 is a block diagram of a computer network 310 having therein the variable latency cut through bridge 210 of FIG. 2. A plurality of computers 312 are connected to the variable latency cut through bridge 210 via a plurality of interconnecting cables 314. In the example of FIG. 3, a first computer 312a is indicated as transmitting to the variable latency cut through bridge 210 and the variable latency cut through bridge 210 is, in turn, shown forwarding data to a second computer 312b and a third computer 312c. In accordance with the present inventive method, data transmitted over the interconnecting cables 314 is in the form of the Ethernet packets 10 of FIG. 1.

Figure 4:
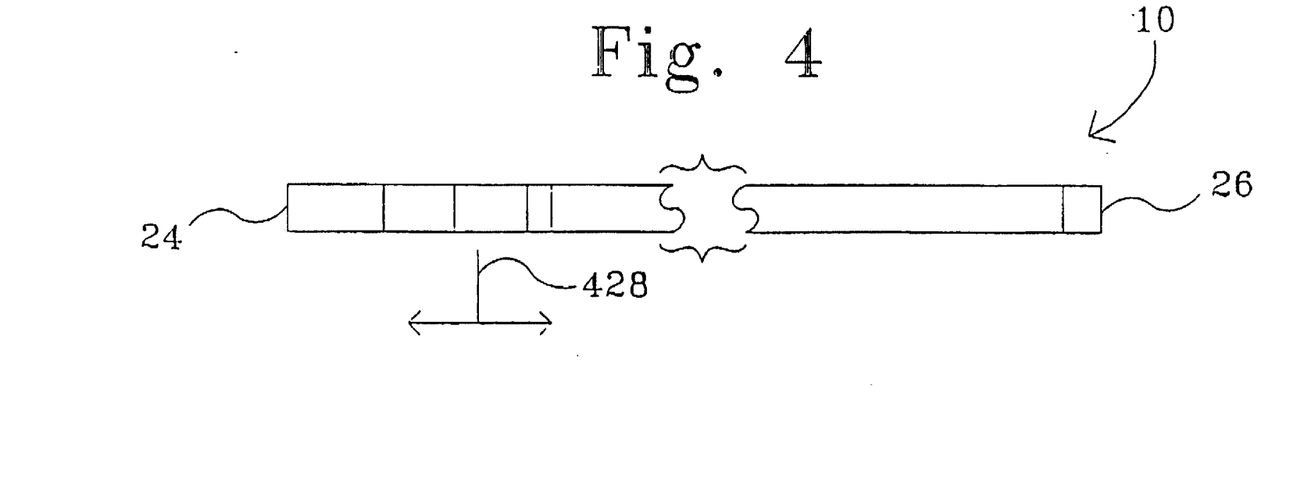
FIG. 4 is a block diagram of an Ethernet packet, similar to that shown in FIG. 1, showing a variable threshold point.

FIG. 4 is a block diagram of the Ethernet packet 10 showing a variable threshold point 428. The variable threshold point 428 is that point in the Ethernet packet 10 at which the variable latency cut through bridge 210 (FIG. 2) begins to forward the Ethernet packet 10. According to the present inventive method, when a determination is made as to a proper location for a threshold point 428 the controller 214 causes the threshold point 428 to move to that location.

Figure 5:
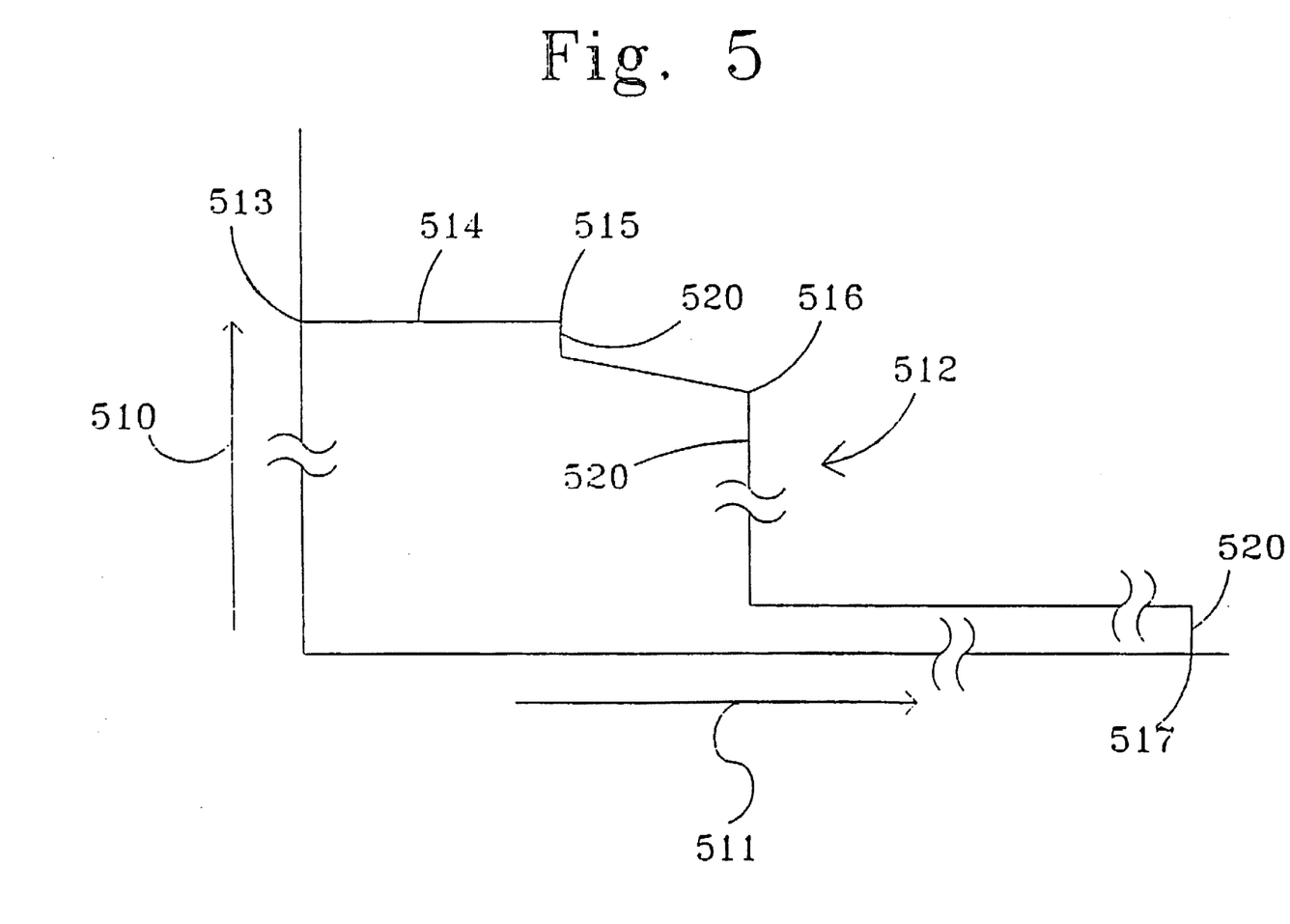
FIG. 5 is a graph showing the probability that an Ethernet packet is bad charted against the amount of the packet which has been analyzed.

FIG. 5 is a graph representing the probability that an Ethernet packet 10 (FIG. 1) is a "bad" or improper packet on the Y axis 510 plotted against the amount of the Ethernet packet 10 that has been examined at the variable latency bridge 210 on the X axis 511. In this sense, "bad" Ethernet packets 10 are those that the variable latency bridge 210 should automatically filter out and not forward. As has been previously discussed herein, in Ethernet many bad packets 10 will be runts. However, bad Ethernet packets 10 also include those with errors in the FCS 22 and other locations within the Ethernet packet 10. The probability that a packet transmission will be involved in a collision, resulting in a runt, depends on what is referred to as the acquisition time for the transmitting station (the first computer 312a in the example of FIG. 3). This will be discussed in greater detail hereinafter in relation to the industrial applicability of the invention. The acquisition time will vary for each application.

As can be seen in the view of FIG. 5, a probability line 512 is highest at an initial point 513 which is a function of the specific acquisition time for the application. The initial point 513 corresponds to the head 24 of the Ethernet packet 10 (FIG. 1). This can be understood as being a reflection of the fact that, since the variable latency cut through bridge 210 (FIG. 2) will reject any Ethernet packet 10 that is "bad" once such condition is discovered, the highest probability that the particular Ethernet packet 10 being examined is "bad" exists at the inception of the process, before the variable latency cut through bridge 210 has had an opportunity to examine any of the Ethernet packet 10. In such a case, no potential flaw locations have been eliminated and the maximum possible flaw locations remain, thus the maximum probability of errors exists.

Since in Ethernet collision processing all runts will be at least of a certain fixed length (such length varying with the application), a first portion 514 of the probability line 512 will be generally flat up to a minimum fragment size point 515 (which minimum fragment size point 515 corresponds to the minimum length of a runt). After the minimum fragment size point 515, the probability line 512 decreases continuously as more stations see the transmitted packet 10 until a transmitting station's network acquisition time which is represented in the graph of FIG. 5 by an acquisition time point 516. Thereafter, the variable latency bridge 210 can no longer be assured that the received packet 10 is a collision fragment and cannot filter it for that reason. However, other errors (such as errors in the FCS 12) may be detected that would ideally cause filtering and the resulting probability does not go to zero until the packet is fully received (probability line end point 517). It can be readily understood that at the end point 517 of the probability line 512 the probability that the Ethernet packet 10 is "bad" is essentially zero for the present purposes, the entire Ethernet packet having been examined within the variable latency cut through bridge 210. That is, were an error (or other reason for not forwarding it) discovered within the Ethernet packet 10, the variable latency cut through bridge 210 would have rejected the Ethernet packet 10 and examination would not have progressed to the tail 26. Since some reasons for not forwarding a packet 10 may not be discoverable until the entire packet 10 is examined, there will be a distinct drop off of the probability line 512 at the end point 517.

Note that the initial point 513, the acquisition time point 516 and the end point 517 will be different for different transmitting stations and that the position of the end point 517 will also depend upon the size of the particular packet 10 being received. The shape of the graph of FIG. 5 is only an example, with specific values of the points 513, 515, 516 and 517 thereof being a function of the particular application. Indeed, the shape of the declining probability line 512 may well not even be linear (at least in portions) although it is assuredly monotonically decreasing.

Of particular significance is that, regardless of the application, there will be three points (the minimum fragment size point 515, the acquisition time point 516 and the end point 517) at which the probability line 512 drops off markedly. These are shown in the graph of FIG. 5 as rapid drop off portions 520 of the probability line 512. Since an object of the variable latency bridge 210 is to position the variable threshold point 428 (FIG. 4) which balance overall latency (the X axis 511 of FIG. 5) with minimization of forwarded junk (the Y axis 510 of FIG. 5), the rapid drop off points 520 are good candidates for the variable threshold point 428. It should be noted that the minimum fragment size point 515 will always occur before the destination address 14 (FIG. 1) is received and cannot, therefore, be used as a position for the variable threshold point 428 where filtering based upon the destination address 14 is desired. Nevertheless, the minimum fragment size point 515 could be useful where the variable latency bridge 210 is not required to filter based upon the destination address 14.

As will be discussed in more detail hereinafter in relation to the industrial applicability of the invention, determination of the values of the points 513, 515, 516 and 517 of the probability line 512 can be achieved either analytically or empirically and either statically or dynamically. Analytically, the worst case values for a network of maximum size with the variable latency bridge 210 at one extreme thereof can be calculated. Empirically, network traffic may be monitored at the point in which the variable latency bridge 210 is (or would be) operating to establish the values. In a more sophisticated future version, the variable latency bridge 210 may itself monitor its received traffic and determine the values empirically and adjusting its values in a dynamic fashion.

It should be noted that, while the example of FIG. 5 is drawn in relation to an Ethernet packet 10, the principles illustrated are applicable to any packet network in which the probability of a packet's being filtered varies over the packet's length.

It should be noted that the rapid drop off portion 520 is by no means the only position to which the variable threshold point 428 might be set. It should further be noted it is a feature of the present inventive variable latency bridge 210 that the variable threshold point 428 may be set according to criteria established to maximize the efficiency of any type of network 310 in which the variable latency bridge 210 might be employed. The setting of the variable threshold point 428 to correspond to the rapid drop off portion 520 is, in the best presently known embodiment 210 of the present invention, an initial "best guess" as to what might be an optimal setting for the variable threshold point 428. As stated previously, the actual location of the rapid drop off portion 520 can readily be empirically determined for a particular application or, more generally, for applications of particular types. It is anticipated that the present inventors, as well as others, will develop improved methods and means for determining the optimal location for the variable threshold point 428. The actual method currently employed by the inventors to set the variable threshold point 428 will be presented in more detail hereinafter in relation to the industrial applicability of the invention.

It will be of interest to those practicing the present invention to note that while the probability of the generation of "junk"—that is, improper packets—is a function of the sending unit (the first computer 312a in the example of FIG. 3), the sensitivity to such "junk"—that is, the amount of harm to efficient throughput that is caused when such junk gets into the network 310—is generally a function of the receiving equipment (the second computer 312b and/or the third computer 312c in the example of FIG. 3). That being the case, it is anticipated that the determination of an "optimal" variable threshold point 428 may require some feedback from the receiving equipment (the second computer 312b and/or the third computer 312c in the example of FIG. 3).

As stated previously herein, the variable latency cut through bridge 210 described herein is a "bare bones" example intended to illustrate the invention. For example, one skilled in the art will recognize that the variable latency cut through bridge 210 might also be equipped to include a buffer clearing means (not shown) for clearing the buffer 212 between iterations of the packet 10, additional buffers (not shown) for buffering several of the packets 10 (as discussed previously herein in relation to the prior art) and/or other conventional appurtenances and features.

Figure 6:
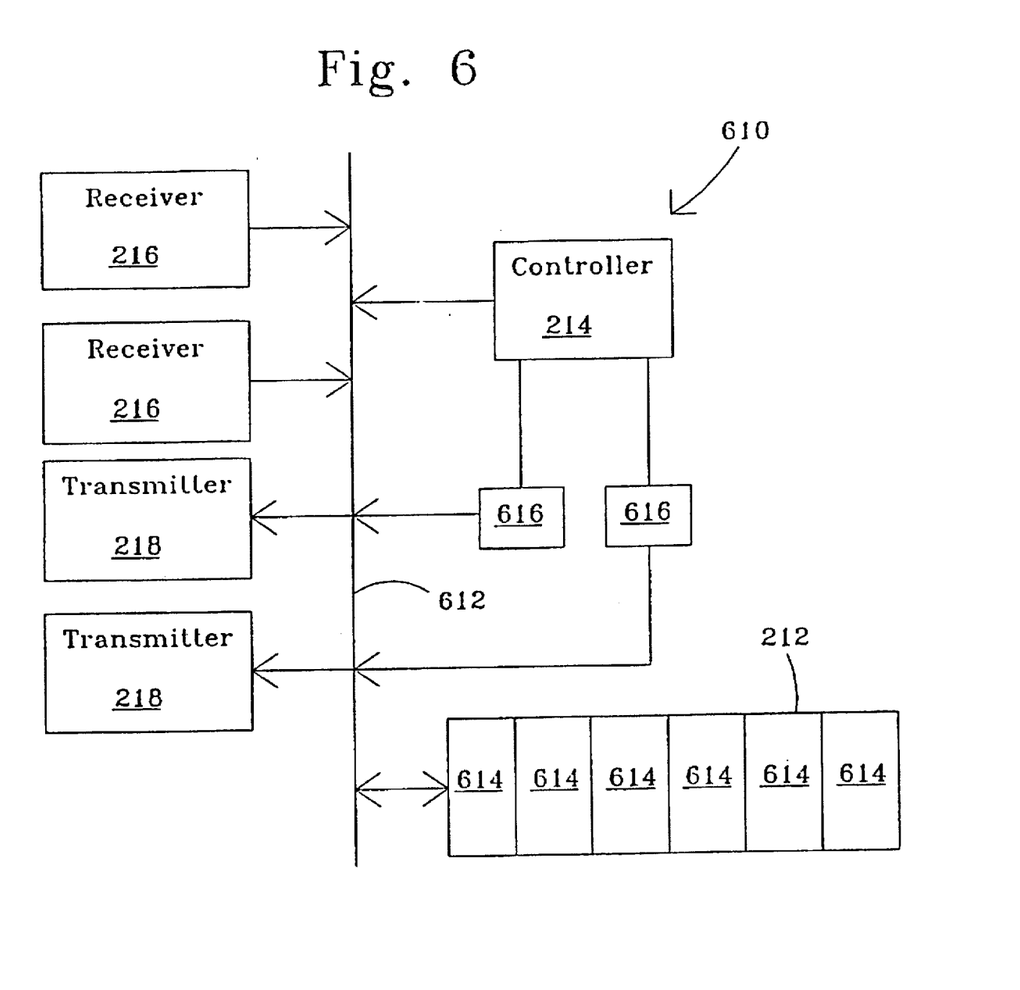
FIG. 6 is an equally preferred alternate embodiment of the inventive variable latency bridge.

FIG. 6 is a block diagram of an equally preferred alternate embodiment 610 of the inventive variable latency cut through bridge. While the first preferred embodiment 210, as previously stated, is a very simple example to best illustrate the principle of the invention, the equally preferred alternate embodiment 610 of FIG. 6 is somewhat more complex in order to illustrate the movement of a data packet 10 within the variable latency bridge 210 according to the present inventive method. In the example of FIG. 6, the variable latency bridge has a plurality (two in the present example) of receivers 216 and a plurality (two in the present example) of transmitters 218. Like the first preferred embodiment 210, the equally preferred alternate embodiment 610 of the present invention also has a buffer 212 and a controller 214. The data packets 210 travel between the various aspects of the equally preferred alternate embodiment 610 of the invention on a data bus 612. The buffer 212 is divided into a plurality (six, in the example of FIG. 6) of packet buffer slots 614. The controller also has associated therewith a plurality (one for each transmitter 218) of first-in-first-out ("FIFOs") 616 memories. The FIFOs 616 are configured to contain packet buffer numbers or pointers to the packet buffer slots 614 of the buffer 212.

A packet 10 received by a receiver 216 from a source LAN (not shown in the view of FIG. 6) is assigned by the controller 214 to a particular packet buffer slot 614 in the buffer 212. As the bytes of the packet 10 (not including the preamble 12) are received by the receiver 216 they are transferred over the data bus 612 and stored sequentially in their assigned packets buffer slot 614. Other packets 10 being received by other receivers 216 will have their bytes of data stored in other assigned packet buffer slots 614 using the controller 214 and the data bus 612 on an interleaved or "time division multiplexed" basis. Each entire packet 10, whether a full packet 10 or a "runt" will be stored in a packet buffer slot 614 of the buffer 212.

The controller 214 monitors the various received packets 10 as they are transferred on the data bus 612 and examines the relevant portions with respect to making a decision as to where and when to forward the packet 10. For example, the destination address 14 will generally be of interest to the controller 214 as will be the number of bytes of the packet 10 which have been transferred at any point in time. When the number of bytes determined by the current position of the variable threshold point 428 has been transferred on the data bus 612, the controller 214 will attempt to begin transmission of the packet 10 through the one or more of the transmitters 218 selected by the controller 214 (for example that transmitter 218 which is associated with the packet's destination address 14). The controller 214 will examine the FIFOs 616 associated with each of the transmitters 218 selected to forward the packet 10 and, if it is empty, the transmission can be started on that transmitter 218 immediately. If the FIFO 516 of a selected transmitter 218 is not empty, the number of the packet buffer slot 614 assigned to the incoming packet 10 will be entered into the appropriate FIFO 616 to enable later transmission. Indeed, the number of the packet buffer slot 614 is entered into the FIFO 616 even if that FIFO 616 is empty (and transmission can begin immediately) so that in the case of a transmit collision the packet 10 can be retransmitted. It should be noted that, in some occurrences, a valid position for the variable threshold point 428 may be such that the entire packet 10 is received before any attempt is made to transmit. When a transmission is successfully completed, the number of the packet buffer slot 614 is removed from the FIFO 616 and that packet buffer slot 614 can be used to store yet another incoming packet 10.

As is shown above, in great part, the variable latency cut through bridge 210 according to the present invention resembles prior art conventional cut through bridges in many respects. Among the substantial differences are the inclusion of a variable threshold point for adjusting the latency of the bridge. No significant changes of materials are envisioned nor are any special constructions required.

Various modifications may be made to the invention without altering its value or scope. For example, although the variable latency cut through bridge 210 described herein, is relatively simple in structure, the inventive method can be used in combination with most features of existing prior art network systems. Also, as previously mentioned herein, although the best presently known embodiment 210 of the present invention is adapted for use with standard Ethernet, one skilled in the art could readily adapt the invention for use with essentially any type of communications means which utilizes data packets and for which the probability of a bad packet varies with the amount of the packet received.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The variable latency cut through bridge is adapted to be widely used in computer network communications. The predominant current usages are for the interconnection of computers and computer peripheral devices within networks and for the interconnection of several computer networks.

The variable latency cut through bridges of the present invention may be utilized in any application wherein conventional computer interconnection bridging devices are used. A significant area of improvement is in the inclusion of the variable threshold point 428 and associated aspects of the invention as described herein.

The inventive variable latency bridge 210 is used in a network in much the same manner as have been conventional prior art cut through bridges, with a potentially significant increase in efficiency in almost all applications. The position of the variable threshold point 428 may be made either statically or dynamically. In the static setting case, a setting is made through a user configuration of the variable latency bridge 210. In this case, the setting would remain unchanged during the operation of the variable latency bridge 210, or until the setting is modified through an explicit action of a user reconfiguring the variable latency bridge 210.

In the case of dynamically setting the variable threshold point 428, decision making logic within the variable latency bridge 210 (heuristic based learning) will be applied, as will be discussed in more detail hereinafter, to modify the setting of the variable threshold point 428 over time to accomplish tuning to minimize errors or to maximize throughput, or to maximize responsiveness to changing conditions of the application within which the variable latency bridge 210 is running.

The inventors have found that static assignment of the variable threshold point 428 may effectively be based on characteristics of the network segments attached to the bridge and on characteristics of the network controllers of devices on those segments. For example, if all controllers on those segments are such that unwanted packets ("junk") is readily discarded without impact on the computer containing the controller (as is the case with many Ethernet controllers in personal computers and workstations today), then the impact of junk is purely loss of bandwidth on the segment. In this case, and where segment bandwidth utilization is generally low, a very low threshold setting may be considered to be highly effective.

On segments where junk has a more negative impact, or where bandwidth is at a premium, more effective settings may require consideration of the rapid drop off portion 520 of the probability line 514 of FIG. 4. The location of the rapid drop off portion 520 is predictable based on the fact that proper deference behavior on an Ethernet precludes collisions outside the so called "collision window", which is the period of time beginning with the start of packet transmission and continuing for a period equal to the maximum round trip signal propagation time from end to end of a maximally configured network segment. It is reasonable to expect the vast majority of junk to be collision fragments whose length will not exceed this collision window length.

An example of the use of the rapid drop off portion 520 of the probability line 514 to set the variable threshold point 428 in a point-to-point ("private channel") Ethernet is as follows: A private channel Ethernet is one comprised of only two controllers; one at a station and one at a hub. When a variable latency cut-through bridge is employed as the hub for such a segment, collision fragments can arise only from collisions occurring when both the bridge and the station begin transmission at around the same time. In such cases, the reception (and possible forwarding) by the variable latency bridge 210 of the fragment can be precluded by the knowledge possessed by the variable latency bridge 210 of its own participation in the collision. Thus, the collision fragments which cause the high initial probabilities of receiving junk (illustrated by the high initial point 516 of the probability line 514 of FIG. 5) will not be present. This suggests use of a very low cut-through latency threshold for such connections.

Figure 7:
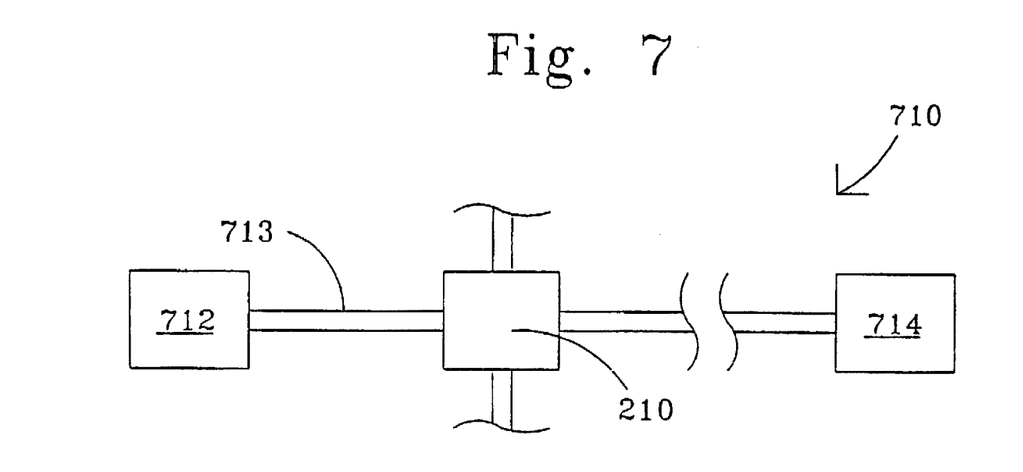
FIG. 7 is an example of the inventive variable latency bridge in use in a single link segment Ethernet.

An example of the use of the rapid drop off portion 520 of the probability line 514 to set the variable threshold point 428 in a single link segment thin coax Ethernet 710 as depicted in FIG. 7. For an attachment from the variable latency bridge to the single segment thin coax Ethernet 710, it can reasonably be expected that an effective threshold setting will be just past the collision window indicated by the maximum round trip propagation time on such a segment. The latest such collision would arise when a first station 712 located very near the variable latency bridge 210, and very near one end of a (185 meter maximum length) cable 713, experiences a last possible moment collision with a second station 714 located at the far end of the cable 713. The time calculation would be as follows: (Note that for a 10 Megabits per second Ethernet, 1 bit time=100 nanoseconds {100 ns}) At time=T0, signal from the first station 712 is the cable 713 at the first station 712 and (for all practical purposes as this example has been defined) at the variable latency bridge 210. At time=T1, the signal has propagated the full length of the cable 713 to the second station 714. At time=T1+T2 the second station 714 controller senses the signal and has just released the first bit of its own packet 10 onto the cable 713, causing a collision condition. At time=T1+T2+T3, the collision combination of signals first arrives back at the first station 712 and at the variable latency bridge 210. At time=T1+T2+T3+T4 the last of the collided signal from the second station 714 reaches the first station 712 and the variable latency bridge 714, at which time the variable latency bridge 210 may determine that the packet 10 transmitted from the second station 714 is a runt.

Given the above maximum error time scenario, calculation of T1 (which is also equal to T3) may be made from the cable length, the speed of light, and the specified cable light speed factor (0.65) of the cable 713 as follows:

T1=T3=((185m/0.65c))=9.5 bit times (where c is the speed of light in meters per second.)

Calculation of worst case times for T2 have been made based on IEEE 802.3 Ethernet standard worst case delay values. This is T2=22.14 bit times.

Calculation of T4 is based on the specified minimum collision fragment, which is 64 bits of preamble 12 and start of frame delimiter, followed by a 32 bit jam pattern, for a total of 96 bit times.

Thus, the worst case collision window is:

T1+T2+T3+T4=9.5+22.14+9.5+96=137.14 bit times (or 13.714 microseconds)

For the example of FIG. 7, a good candidate for the setting of the variable threshold point 428 (which begins measuring only after the 64 bits of preamble 12) is:

137.14−164=73.14 bit times, or between 9 and 10 bytes into the received packet.

For an attachment from the variable latency bridge 10 to a maximally configured Ethernet segment 810 as depicted in FIG. 8, it is again assumed (at least initially) that an effective position for the variable threshold point 428 would be just past the collision window indicated by the maximum round trip propagation time on such a segment. This maximal configuration 810 has 5 full length cable runs 713a through 713b attached with a plurality (four, in the case of the maximally configured Ethernet segment 810) of maximally delaying repeaters 816. In this case, the "latest" collision detection would arise when a first end station 818 located very near one end of the first cable 713a and very near the variable latency bridge 210 experiences a last possible moment collision with a second end station 820 located at the far end of the fifth cable 713e through all four repeaters 816. Given the general practice, it can be assumed in the example of FIG. 8 that the interior cables 713b, 713c and 713d are "thick coax" cabling, and the "end run" cables 713a and 713e are "thin coax". The time calculation for this example is much the same as in the example of FIG. 7, except that the propagation times (T1 and T3) are quite a bit larger. Also the propagation back of the collision is subject to potentially larger delays within the repeaters 816 than is the propagation forward, so T3 will be larger than T1. Again using 802.3 worst case delay specifications, these propagation delays are calculated to be T1=182.48 bit times and T3=222.48 bit times.

Figure 8:
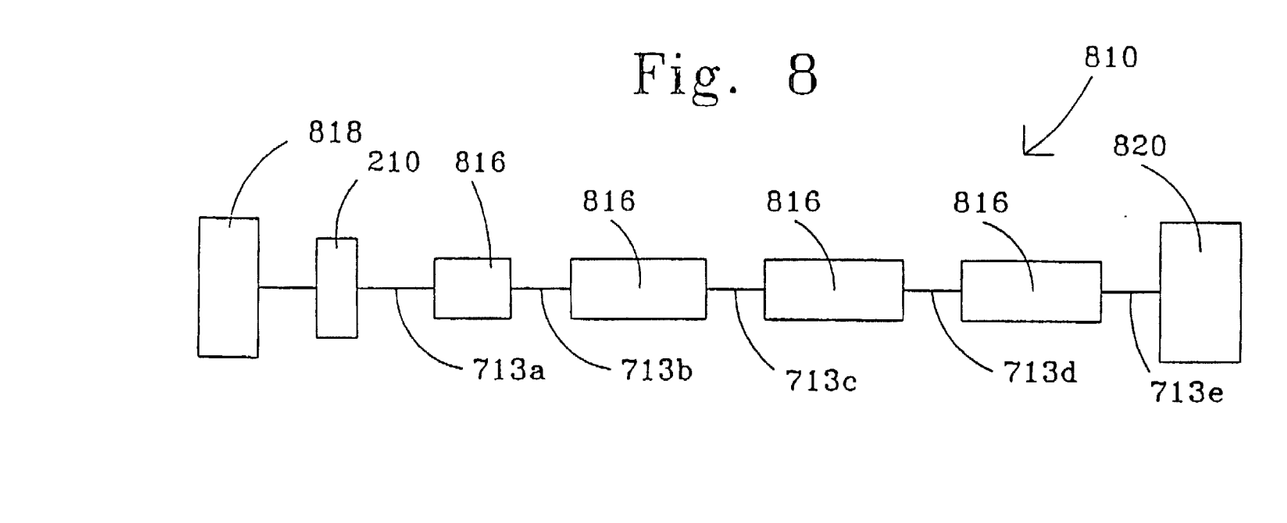
FIG. 8 is an example of the inventive variable latency bridge in use in a maximally configured Ethernet.

The other components of this calculation remain as in the example of FIG. 7, revealing the worst case window to be:

T1+T2+T3+T4=182.48+22.14+222.48+96=523.1 bit times (or 52.3 microseconds)

A good candidate for the setting of the variable threshold point 428 in the example of FIG. 8 would be 523.1−64= 459.1 bit times, or between 57 and 58 bytes into the received packet.

As previously mentioned, the variable threshold point 428 of the variable latency bridge 210 certainly need not remain fixed during operation of the variable latency bridge 210. In order to maximize overall data throughput, a small percentage of errors being forwarded may be preferable to overly delaying the cut through operation. The specific acceptable percentage of errors may be employed using simple heuristic logic to periodically adjust the variable threshold joint 428 based on the number of packets 10 which the variable latency bridge 210 has been forwarding and the amount of "junk" packets among the good packets. More specifically, if PE is the maximum acceptable percentage of errors which it is decided will be tolerated in forwarding the packets 10, and the variable latency bridge 210 maintains counts of packets 10 forwarded (PF) and the number of those forwarded which, subsequent to forwarding, were found to be errored packets (EP), then every time PF reaches some sample size (such as 10,000) the variable latency bridge 210 could (in hardware or software) compute EP divided by PF, and compare the resulting percentage to PE. If the ratio is greater than PE, the threshold position would be increased, to seek to reduce the forwarded error rate. If the ratio is less than PE, the threshold value would be decreased, since a higher error rate is considered acceptable. The two counts would then be reset for the next sample period.

Since the variable latency cut through bridges of the present invention may be readily constructed and are compatible with existing computer equipment it is expected that they will be acceptable in the industry as substitutes for conventional bridges. For these and other reasons, it is expected that the utility and industrial applicability of the invention will be both significant in scope and long-lasting in duration.

We claim:

1. A cut through bridge for connecting at least two computer network segments, having a plurality of computer devices interconnected by a plurality of data transmission devices wherein data packets are transmitted over the data transmission devices, the cut through bridge comprising:

a buffer for temporarily holding the data packets;

a controller for controlling said buffer such that the data packets are forwarded of said buffer upon command from said controller; and means for adjusting a latency threshold point of the buffer while the cut through bridge operating in the computer network, the latency threshold point specifying that portion of each data packet which is received by the buffer prior to said controller commanding said buffer to forward that data packet, wherein the means for adjusting adjusts the latency threshold point dynamically.

2. The cut through bridge of claim 1, wherein said latency threshold point is set to value after a preamble of the data packet.

3. The cut through bridge of claim 1, wherein the latency threshold point is set to be within a rapid drop off portion of a probability function, the probability function describing the probability that a data packet is bad as a function of the amount of the data packet is bad as a function of the amount of the data packet which has been examined.

4. The cut through bridge of claim 3, wherein the probability function is empirically determined.

5. The cut through bridge of claim 1, wherein the means for adjusting is operative to set the latency threshold point in response to user manual adjustment of settings on the cut through bridge.

6. The cut through bridge of claim 1, wherein the means for adjusting includes software for setting a value of the latency threshold point.

7. The cut through bridge of claim 1, wherein the means for adjusting includes hardware for setting a value of the latency threshold point.

8. The cut through bridge of claim 1, wherein the means for adjusting is capable of adjusting the latency threshold point to a level at which the portion of the data packet which is received by the buffer prior to said controller commanding said buffer to forward that data packet is the entire packet.

9. A method for improving the efficiency of a computer network having a plurality of network segments therein, wherein data is communicated in the form of data packets, the method comprising:

providing a cut through bridge between the network segments, said cut through bridge being configured to forward each data packet when that data packet is received by the cut through bridge and verified as being one which should be forwarded, said cut through bridge having a variable latency threshold point for determining the portion of that data packet that is received before being verified as one which should be forwarded;

setting the variable latency threshold point to an initial value; and dynamically adjusting thereafter the variable latency threshold point while the cut through bridge is operating to a second value which is different from said initial value, wherein said step of dynamically adjusting the variable latency threshold point is performed automatically by the cut through bridge.

10. The method of claim 9, wherein the variable latency threshold point is dynamically adjusted to a value such that any runts will be rejected and thereby not forwared by said cut through bridge.

11. The method of claim 9, wherein the variable latency threshold point is dynamically adjusted according to empirically gathered data.

12. The method of claim 9, wherein the variable latency threshold point is dynamically adjusted as a function of a probability line, the probability line being represented by a graph of a probability value that the data packet should not be forwarded versus an amount of the data packet that has been examined within said cut through bridge.

13. The method of claim 12, wherein the variable latency threshold point is dynamically adjusted to within a rapid drop off portion of the probability line, the rapid drop of portion being a portion of the probability line wherein the probability value of the probability line drops markedly toward zero.

14. A method for forwarding data packets with a cut through bridge connecting at least two computer network segments, the method comprising:

setting a variable latency point within the cut through bridge to an initial value, said variable latency threshold point determining the portion of each data packet that is received by the cut through bridge before being verified as one which should be forwarded; and adjusting thereafter the variable latency threshold point while the cut through bridge is operating to a second value which is different from said initial value, wherein said step of adjusting the variable latency threshold point is performed dynamically.

15. The method of claim 14, wherein said variable latency threshold point is set to value after a preamble of the data packet.

16. The method of claim 14, wherein said variable latency threshold point is set such that essentially all runts will be rejected before said variable latency threshold point is reached in each data packet, a runt being an incomplete data packet resulting from an aborted attempt to transit that data packet.

17. The method of claim 14, wherein the adjusting is performed by adjusting said variable latency threshold point according to data obtained during the operation of the cut through bridge.

18. The method of claim 14, wherein the adjusting, is performed by setting said variable latency threshold point by software from a computer.

19. The method of claim 18, wherein the computer is connected to a computer network segment through the cut through bridge.

20. The method of claim 18, wherein the computer retains information concerning the packets for optimizing the position of said variable latency threshold point.

21. The method of claim 14, wherein said variable latency threshold point is adjusted according to the demands of the computer network segments.

22. The method of claim 14, wherein said variable latency threshold point is adjusted according to a calculation of an acquisition time of an application.

23. The method of claim 14, wherein the variable latency threshold point is set according to empirically determined data gathered during operation of the cut through bridge.

24. The method of claim 14, further comprising adjusting the variable latency threshold point to a third value, which is different from said initial value, by a user's manual adjustment of settings on the cut through bridge.

25. A cut through bridge for connecting at least two computer network segments, having a plurality of computer devices interconnected by a plurality of data transmission devices wherein data packets are transmitted over the data transmission devices, the data packets having data fields, the cut through bridge comprising:

a buffer for temporarily holding the data packets;

a controller for controlling said buffer such that the data packets are forwarded out of said buffer upon command from said controller;

means for adjusting a latency threshold point of the buffer while the cut through bridge is operating in the computer network, the latency threshold point specifying that portion of each data packet which is received by the buffer prior to said controller commanding said buffer to forward that data packet, wherein the means for adjusting adjusts the latency threshold point dynamically without affecting the length of the data field in the data packet.

26. A cut through bridge for connecting at least two computer network segments, having a plurality of computer devices interconnected by a plurality of data transmission devices wherein data packets are transmitted over the data transmission devices, the cut through bridge comprising:

a buffer for temporarily holding the data packets;

a controller for controlling said buffer such that the data packets are forwarded out of said buffer upon command from said controller; and means for adjusting the latency threshold point of the buffer while the cut through bridge is operating in the computer network such that the latency threshold point, specifying that portion of each data packet which is received by the buffer prior to said controller commanding said buffer to forward that data packet, is set at any level between and including the beginning of a data packet and the last bit of said data packet, wherein the means for adjusting adjusts the latency threshold point dynamically.

27. The cut through bridge of claim 26, wherein the means for adjusting includes software for setting a value of the latency threshold point.

28. The cut through bridge of claim 26, wherein the means for adjusting includes hardware for setting a value of the latency threshold point.

29. A method for forwarding data packets with a cut through bridge connecting at least two computer network segments, the method comprising;

setting a variable latency point within the cut through bridge to an initial value, said variable latency threshold point determining the portion of each data packet that is received by the cut through bridge before being verified as one which should be forwarded; and adjusting thereafter the variable latency threshold point while the cut through bridge is operating to a second value which is different from said initial value, wherein said step of adjusting the variable latency threshold point is performed dynamically, and wherein the first and second values of the variable latency threshold point may be any level between and including the beginning of a data packet and the last bit of said data packet.

30. The method of claim 29, wherein the adjusting is performed by adjusting said variable latency threshold point according to data obtained during the operation of the cut through bridge.

31. The method of claim 29, wherein the adjusting, is performed by setting said variable latency threshold point by software from a computer.

32. The method of claim 31, wherein the computer is connected to a computer network segment through the cut through bridge.

33. The method of claim 31, wherein the computer retains information concerning the packets for optimizing the position of said variable latency threshold point.

34. The method of claim 29, wherein said variable latency threshold point is adjusted according to the demands of the computer network segments.

* * * * *